United States Patent [19]
Gerauer

[11] 3,709,049
[45] Jan. 9, 1973

[54] NON-SLIP LINEAR TO ROTARY MOTION CONVERSION APPARATUS

[75] Inventor: Ernst A. Gerauer, Norwalk, Conn.

[73] Assignee: Metron Corporation, Providence, R.I.

[22] Filed: Sept. 8, 1970

[21] Appl. No.: 70,152

[52] U.S. Cl..................................................74/89.2
[51] Int. Cl..............................................F16h 27/02
[58] Field of Search.........................................74/89.2

[56] References Cited

UNITED STATES PATENTS

| 987,909 | 3/1911 | Peirce | 74/89.2 |
| 1,042,628 | 10/1912 | Waybright | 74/89.2 |
| 3,521,499 | 7/1970 | Keith | 74/89.2 |

*Primary Examiner*—Milton Kaufman
*Assistant Examiner*—Wesley S. Ratliff, Jr.
*Attorney*—Bryan, Parmelee, Johnson & Bollinger

[57] ABSTRACT

A non-slip linear to rotary motion conversion apparatus is provided for use with an angular measuring device. A cylinder having a very accurate constant diameter is mechanically coupled to an angular measuring device capable of accurately measuring the rotary motion of the windings or coils arranged in non-overlapping single turns around the surface of the cylinder and having free wire portions extending tangentially therefrom in opposite directions from the cylinder. The free wire portions are anchored at their free end to maintain the wire means in tension and the coils are offset to prevent overlapping of the coils on the cylinder. Means is provided for mechanically coupling at least one coil of the wire means to the cylinder whereby a non-slip highly reliable, linear to rotary motion conversion apparatus is provided that is mechanically absolute relative to the angular measuring device.

4 Claims, 5 Drawing Figures

PATENTED JAN 9 1973

INVENTOR.
Ernst A. Gerauer
BY
Bryan, Parmelee, Johnson & Bollinger
ATTORNEYS.

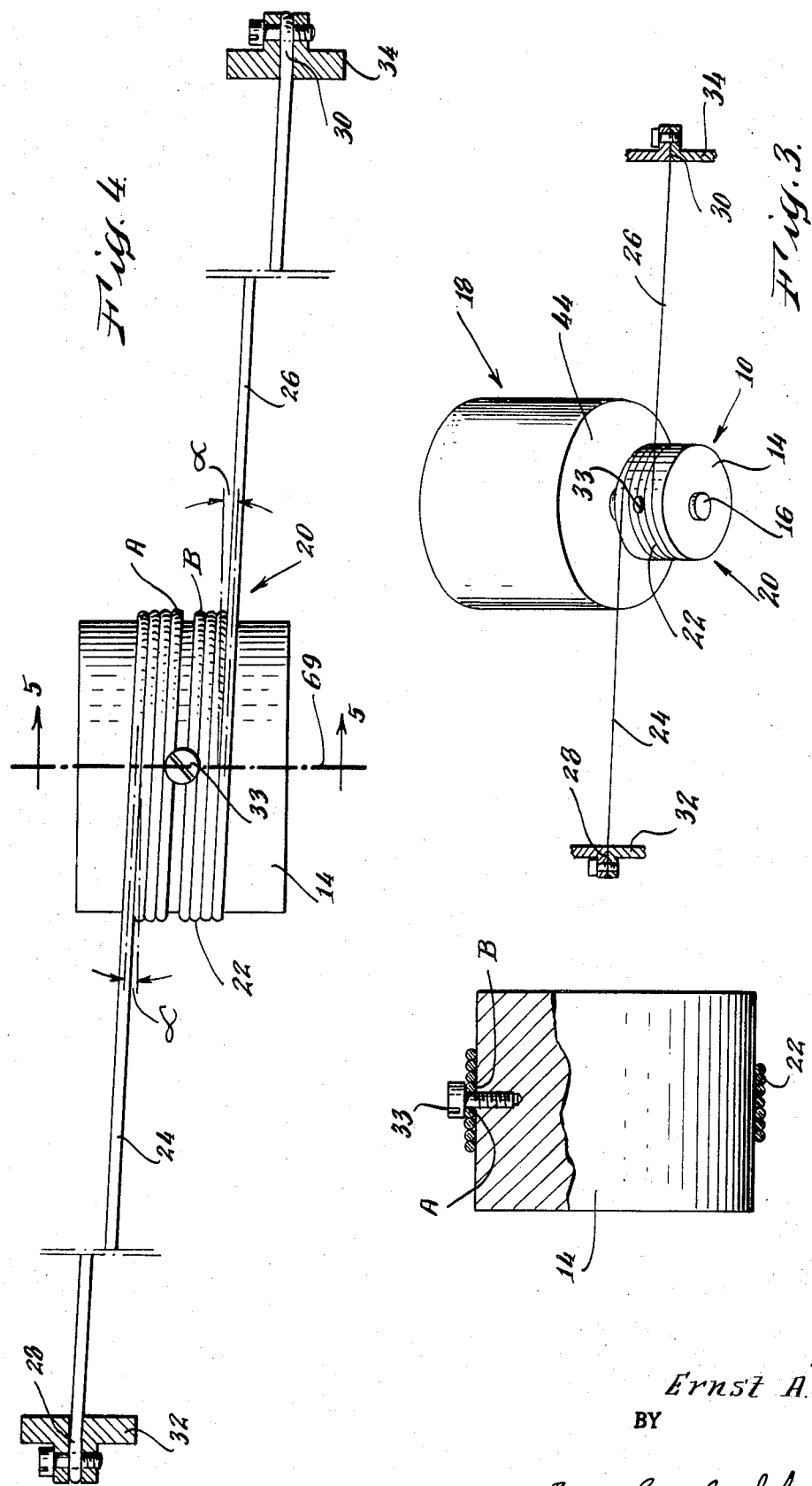

NON-SLIP LINEAR TO ROTARY MOTION CONVERSION APPARATUS

DESCRIPTION

This invention relates to a linear to rotary motion conversion apparatus. More specifically, this invention relates to a non-slip linear to rotary motion conversion apparatus for use with an angular measuring device to provide accurate conversion of linear to rotary motion in machine tools, coordinate measuring machines, drafting machines and the like.

Prior linear measuring apparatus for converting linear to rotary motion have generally encountered the disadvantage of depending on the friction of a wheel rolling over a straight surface or tape. The friction may be overcome by acceleration, deceleration, vibration, or misalignment of the measuring device, thereby causing slippage of the wheel with the resultant accumulation of measuring errors.

One such prior apparatus utilizes the friction produced by a single turn of tape arranged about a precisely ground drum. One end of the tape is attached to a takeup drum within an angular measuring device and the other end of the tape is attached to the moving member of a machine.

The present invention provides a non-slip linear to rotary motion conversion apparatus in which linear and rotary motion are mechanically tied together preventing slippage during measurement. A cylinder having a very accurate constant diameter is mechanically coupled to an angular measuring device capable of accurately measuring the rotary motion of the cylinder. Wire means is included having a plurality of coils or windings arranged in non-overlapping single turns around the surface of the cylinder and having free wire portions extending tangentially therefrom in opposite directions from the cylinder. The free wire portions are anchored at their free end to maintain the wire means in tension and the windings are offset to prevent overlapping of the coils on the cylinder during operation. Means is provided for mechanically coupling at least one of the windings of the wire means to the cylinder so that the linear and rotary motion are rigidly linked together providing a non-slip measuring apparatus.

It may also be advantageous in some applications of the apparatus where extreme accuracy is not required to utilize the plurality of windings as the mechanical coupling means. That is, the plurality of windings themselves providing enough holding force around the cylinder to prevent slippage.

It is an advantage of the present invention that a non-slip, highly reliable, linear to rotary motion conversion apparatus is provided.

It is another advantage that the entire measuring system is made essentially mechanically absolute.

It is another advantage that wire crossover of the windings is eliminated thereby insuring accurate and reliable measurements.

It is another advantage that the apparatus has improved wire loading characteristics. Since essentially twice the length of wire is used, as compared with the single turn tape system, the increased resiliency of the wire can be advantageously used to reduce backlash and sagging problems.

It is a further advantage that the system is hermetically sealed to prevent foreign particles from gaining access to the wire and cylinder inhibiting the accuracy and reliability of the measurements.

Other objects, aspects and advantages of the present invention will be more fully understood when the detailed description is considered in conjunction with the drawings as follows:

FIG. 3 is a perspective view of the linear to rotary motion conversion apparatus mechanically coupled to the angular measuring device with the protective enclosing means removed for clarity;

FIG. 4 is a plan view of the rotary to linear motion conversion apparatus of FIG. 3 with the angular measuring device omitted for clarity; and FIG. 5 is a sectional view taken along lines 5—5 of FIG. 4.

Figure 1:
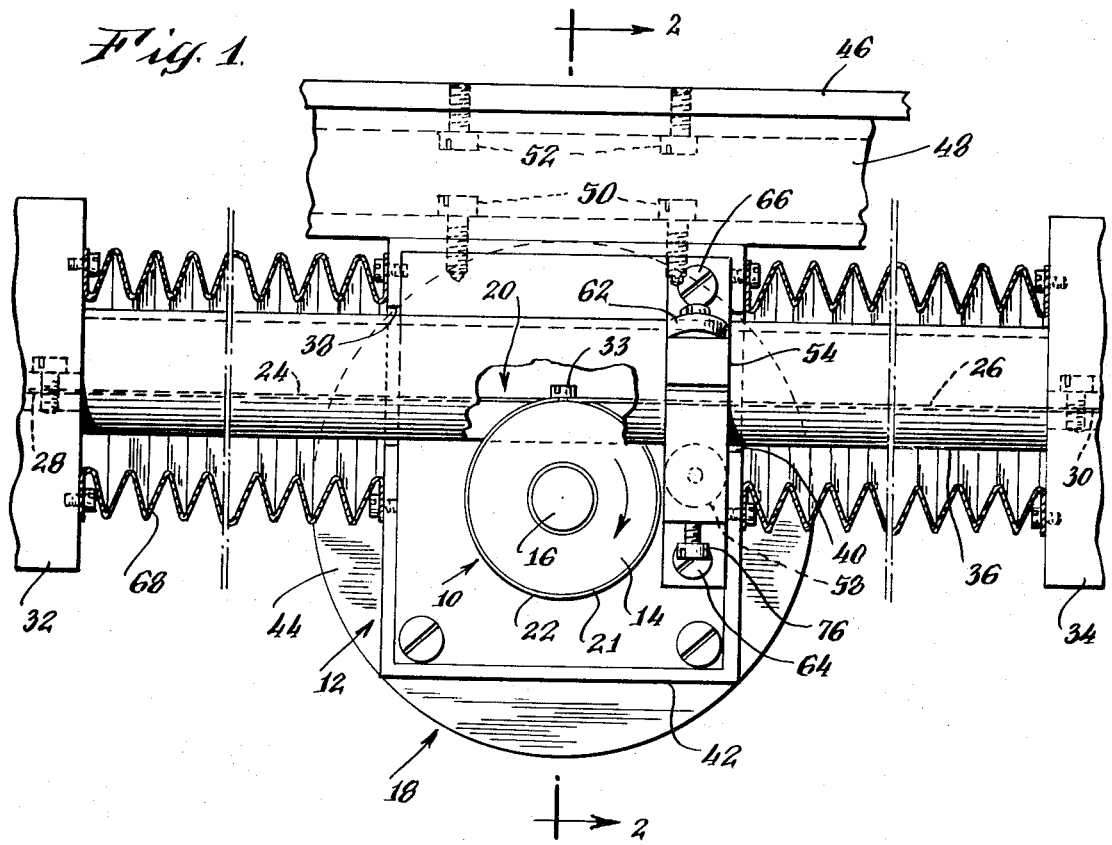
FIG. 1 is a partial sectional view of the linear to rotary motion conversion apparatus, with protective enclosing means, connected to a machine tool such as a lathe.

Referring to FIG. 1 the linear to rotary conversion apparatus 10 is shown in its operating environment with the protective enclosing means 12. The linear to rotary motion conversion apparatus 10 includes a precisely ground or lapped cylinder or drum 14 of constant diameter concentrically connected to the shaft 16 of an angular measuring device 18. Fine wire means 20 including a plurality or multiplicity of windings or coils 22 is arranged about the surface 21 of the cylinder 14 and free wire portions 24 and 26 extend tangentially away from the cylinder 14 in opposite directions and generally in a plane tangential to the surface 21 of cylinder 14. The wire means 20 may be advantageously made from spring steel, e.g. piano wire.

The free wire portions 24 and 26 have their ends 28 and 30, respectively, anchored or fastened to brackets 32 and 34, respectively, connected for example to the bed of a machine tool such as lathe (not shown). Anchoring means, shown as a machine screw 33, is provided for mechanically coupling at least one winding of the wire means 20 to the cylinder 14, so that linear and rotary motion are mechanically linked preventing slippage during measurement.

Figure 2:
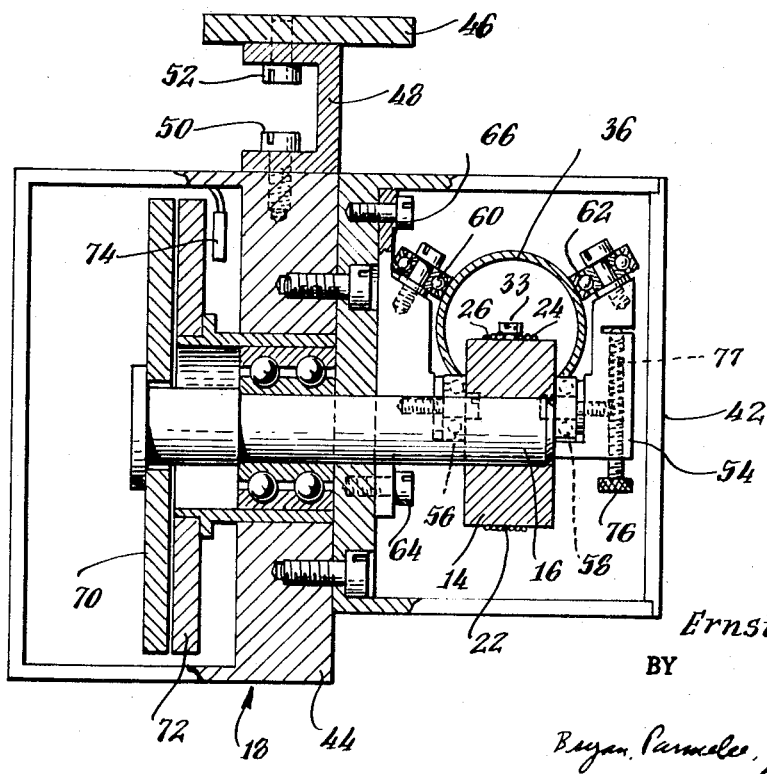
FIG. 2 is a partial sectional view taken along lines 2—2 in FIG. 1.

The protective enclosing means 12 includes a slotted elongate tube 36 for encasing the free wire portions 24 and 26 and a protective housing 42, having openings 38 and 40 arranged about the tube 36 for encasing the cylinder 14 and windings 22 which are arranged thereon, fastened to the frame 44 of the angular measuring device 18, see also FIG. 2.

The protective housing 42 and angular measuring device 18 are rigidly coupled together and rigidly mounted to the saddle 46 of a machine tool such as a lathe (not shown) through bracket 48 with the aid of bolts 50 and 52. The bracket 48 is rigidly fastened between frame 44 of the angular measuring device 18 and the saddle 46 of the lathe, see FIG. 2.

The elongate slotted tube 36, which may, for example, be made of stainless steel, is positioned between brackets 32 and 34 and attached to the machine tool by any suitable known fastening means (not shown). The cylinder 14 is partially positioned within the slotted tube 36 so that the free wire portions 24 and 26 are completely encased therein while a portion of the windings 22 remain external thereof.

The slotted steel tube 36 is placed in sliding contact with a seating flange 54 through bearings 56, 58, 60 and 62. The seating flange 54 is fastened to the protective housing 42 by machine screws 64 and 66 for relative linear movement of the angular measuring device 18, and protective housing 42 back and forth between the anchored ends 28 and 30 of the wire means 20 with the bearings 56, 58, 60 and 62 in contact with the slotted steel tube 36.

Disposed about the elongate slotted stainless steel tube 36 is a flexible bellows-like covering 68 which is fastened to the protective housing 42 and the brackets 32 and 34, respectively. The protective enclosing means 12, including the bellows-like covering 68, insures that foreign particles do not gain access to the wire means 20 or cylinder 14 and inhibit the accuracy and reliability of the conversion apparatus 10.

Referring to FIG. 3 the protective covering means 12 is removed for clarity of description. The linear to rotary conversion apparatus 10 including the cylinder 14 and wire means 20 is shown concentrically connected to the shaft 16 of the angular measuring device 18 with the ends 28 and 30 of the wire means 20 anchored to brackets 32 and 34, respectively.

Referring particularly to FIGS. 4 and 5, the windings or coils 22 are shown arranged about the cylinder 14 in adjacent, non-overlapping, contact. The anchoring means, shown as a screw 33, mechanically couples the center two windings or turns A and B of the wire means 20 rigidly to the cylinder 14. The apparatus 10 is thereby made essentially mechanically absolute by rigidly linking the linear and rotary motion together. However, it should be understood that the wire means 20 may also be fastened to the cylinder 14, e.g. by welding. The total length of windings 22 arranged about the cylinder 14 remains constant during movement of the cylinder back and forth between the anchored ends 28 and 30. Further, the total length of the windings 22 arranged about the cylinder 14 is at least equal to the distance between the anchored ends 28 and 30 of said free wire portions 24 and 26, respectively, for complete movement of the cylinder 14 back and forth from one wire end 28 to the other wire end 30.

The shaft 16 of the angular measuring device 18, which may be for example an incremental or coded shaft encoder, resolver or the like, is mechanically coupled to the cylinder 14, rendering the measuring system mechanically absolute.

Further, the windings 22 may be slightly offset relative to a plane perpendicular to the axis 69 of the cylinder 14, This is, the free wire portions 24 and 26 of the wire means 20 extend away from the windings 22 and are offset essentially the thickness of the wire means 20, see angle α in FIG. 4. Thus, during winding and unwinding of the wire means 20 there is no overlapping of the windings 22; the offset wire ends 28 and 30 serving as a wire guiding means for the winding and unwinding of the wire means 20 during operation. Further, the wire means 20, having a multiplicity or plurality of windings around the cylinder 14, increases the resiliency of the system and greatly improves the loading characteristics of the apparatus 10.

In operation, the relative motion between the anchored ends 28 and 30 of the wire means 20 and the cylinder 14 produces a rotation of the shaft 16 of the angular measuring device 18 which is mechanically linked to the wire means 20 through fastening means 33 and cylinder 14. The rotation of shaft 16 produces a rotation of measuring plate 70 relative to measuring plate 72. The relative movement of the measuring plates 70 and 72 is sensed and converted into an electrical signal with the aid of transducer 74; the signal is transmitted to a display (not shown) for reading by an operator. That is, any incremental linear movement of the cylinder 14 along the wire means 20 produces an incremental relative rotation of the measuring plates 70 and 72 which is electronically converted to distance on the display.

The finely machined or lapped cylinder 14 is arranged for bidirectional lateral movement between the anchored ends 26 and 28. Wire winds around the cylinder 14 along one free wire portion 24 while unwinding from the cylinder 14 along the other free wire portion 26. The overall length of windings 22 and preload tension force exerted on the cylinder 14 by the wire means 20 remaining constant.

The angular measuring device 18, cylinder 14 housing 42, and seating flange 54, attached thereto, undergo bidirectional movement along the elongate slotted tube 36 by means of bearings 56, 58, 60 and 62. The elongate slotted tube 36, housing 35 and bellows 68 insure that foreign matter does not gain access to the wire means 20 or cylinder 14 disturbing the accuracy or reliability of the conversion apparatus. Further, a bearing pre-load means, shown as a machine screw 76 and spring 77 may be positioned in seating flange 54 to provide an adjustable bias for positioning the bearings 58 and 62 in sliding contact with the elongate slotted tube 36.

It should be understood by those skilled in the art that various modifications may be made in the present invention without departing from the spirit or scope of the invention as described in the specification and defined in the appended claims.

What is claimed is:

1. A non-slip linear to rotary motion conversion apparatus for use with an angular measuring device to provide an accurate and highly reliable measuring system for machine tools, coordinate measuring machines, drafting machines, and the like, said apparatus comprising:

a cylinder having a precise constant diameter mechanically coupled to said angular measuring device, the rotary motion of said cylinder being measured by said angular measuring device;

wire means including a plurality of windings completely encircling the surface of said cylinder and first and second free wire portions extending tangentially away from said cylinder in opposite directions from the surface of said cylinder in a plane tangential to the surface of the cylinder, said first and second free wire portions being anchored at their free ends at first and second spaced points, respectively, to maintain said wire means in tension allowing relative motion between said cylinder and said anchored ends, said windings being arranged in non-overlapping single turns around said cylinder;

means for mechanically coupling at least one turn of said windings to said cylinder;

an elongate wire protective means for encasing at least the total length of said free wire portions to maintain said wire means between said anchored ends free of foreign matter which may inhibit the accuracy of the linear to rotary motion conversion apparatus as said cylinder and anchored wire ends undergo relative motion, said elongate wire protective means including an elongate slotted tube and a protective housing arranged about said elongate slotted tube, said protective housing completely encasing said cylinder and capable of relative movement with said cylinder between said anchored wire ends; and means for providing slidable linear movement of said protective housing along said elongate slotted tube, whereby an essentially mechanically absolute, non-slip, highly reliable, linear to rotary motion conversion apparatus is provided.

2. A non-slip linear to rotary motion conversion apparatus as claimed in claim 1 including:

a flexible covering means for hermetically encasing said elongate slotted tube to prevent foreign particles from gaining access to said free wire portion arranged within said elongate slotted tube and said cylinder positioned within said protective housing, said flexible covering means being arranged between said anchored wire ends and said protective housing.

3. A non-slip linear to rotary motion conversion apparatus as claimed in claim 1 wherein:

said windings are arranged offset relative to a plane perpendicular to the axis of said cylinder, and the free wire portions are offset from a plane perpendicular to the axis of said cylinder, the amount of offset per winding being equal to approximately the thickness of said wire whereby the windings are prevented from overlapping during winding and unwinding.

4. A non-slip linear to rotary motion conversion apparatus as claimed in claim 1 wherein:

a plurality of roller bearing means are mounted on said protective housing;

a pair of said roller bearing means engaging the exterior of said slotted tube on opposite sides thereof; and another pair of roller bearing means engaging opposite sides of the slotted portion of said tube for providing rolling linear movement of said cylinder and protective housing along said elongate slotted tube.

* * * * *